United States Patent [19]

Robert

[11] Patent Number: 4,518,816
[45] Date of Patent: May 21, 1985

[54] LIGHTNING CONDUCTOR WITH PIEZOELECTRIC DEVICE FOR INITIATING THE CORONA EFFECT

[75] Inventor: Andre Robert, Le Mesnil Saint Denis, France

[73] Assignee: Commissariat a l'Energie Atomique, Paris, France

[21] Appl. No.: 592,702

[22] Filed: Mar. 23, 1984

[30] Foreign Application Priority Data

Mar. 25, 1983 [FR] France .................. 83 04947

[51] Int. Cl.³ .................. H02G 13/00; H01T 1/20; H01T 19/00
[52] U.S. Cl. .................. 174/3; 174/4 R; 310/339; 361/117; 361/137
[58] Field of Search .................. 174/2, 3, 4 R, 4 C; 310/339; 361/117, 137

[56] References Cited

U.S. PATENT DOCUMENTS

| | | | |
|---|---|---|---|
| 2,854,499 | 9/1958 | Capart | 174/3 X |
| 3,350,496 | 10/1967 | Ritter | 174/4 C |
| 4,480,146 | 10/1984 | Invernizzi | 174/4 R X |

FOREIGN PATENT DOCUMENTS

| | | | |
|---|---|---|---|
| 0060756 | 9/1982 | European Pat. Off. | 174/3 |
| 1089440 | 9/1960 | Fed. Rep. of Germany | 174/4 R |
| 907037 | 6/1945 | France | 361/117 |
| 2489053 | 2/1982 | France | 174/4 C |
| 2490286 | 3/1982 | France . | |
| 1258029 | 12/1971 | United Kingdom . | |

Primary Examiner—Laramie E. Askin
Attorney, Agent, or Firm—Michael N. Meller

[57] ABSTRACT

The present invention relates to a lightning conductor with a piezoelectric device for initiating the corona effect.

It comprises a metal rod terminated by a tip and connected to the ground by an electric conductor. In the vicinity of the tip are provided one or more electrodes, which are electrically connected to one or more piezoelectric crystals, on which a means exerts a mechanical pressure. This makes it possible to raise the electrodes to an adequate potential for producing charged particles in the vicinity of the tip.

4 Claims, 5 Drawing Figures

LIGHTNING CONDUCTOR WITH PIEZOELECTRIC DEVICE FOR INITIATING THE CORONA EFFECT

BACKGROUND OF THE INVENTION

The present invention relates to a lightning conductor with a piezoelectric device for initiating the corona effect.

In per se known manner, a lightning conductor comprises a vertical rod terminated by a metal point or tip and connected to earth by a conductor, which is called a downlead.

The path along which the lightning current flows is constructed in two stages. In a first stage, a downward precursor, constituted by charged particles, which are very often electrons, is directed towards the ground. The general direction of its movement is linked with the local electric field. On the approach of this precursor, objects on the ground undergo an intense electric field and at the most favourable points this leads to the appearance of upward discharges called upward tracers. The first upward tracer which encounters a downward precursor closes the circuit in which the lightning current flows. Thus, the lightning strikes at the point able to emit the fastest upward tracer.

At the approach of the precursors, the lightning conductor tip produces an electric field, which is normally much higher than that in the area surrounding it. It is therefore the most likely point where the upward tracer will start. The efficiency of the lightning conductor, i.e. the extent of the area protected, increases in proportion to the preferred nature of the emission of the upward tracer from the tip compared with the emission of such a tracer from another point.

It is known that the upward precursor is due to the appearance of the corona effect, which consists of an intense electron emission from the tip under the influence of an intense electric field. This electron emission takes place with a time lag of a few dozen microseconds after the electric field has reached the value necessary for initiating the corona effect.

This time lag can be reduced on increasing in the vicinity of the tip, the population of free electrons. The corona effect then starts from a nuclear electron present in the vicinity of the tip, at the instant when the electric field reaches a minimum value below the aforementioned initiating value.

By reducing the time lag of initiating the corona effect on the tip, an upward tracer is consequently produced earlier and will encounter a downward tracer at a higher altitude. This consequently increases the area protected by the lightning conductor.

SUMMARY OF THE INVENTION

The object of the present invention is to produce a corona effect by raising to a high electric potential an electrode appropriately positioned in the vicinity of the tip, which will produce free electrons in the vicinity of said tip.

More specifically, the present invention relates to a lightning conductor with a device for initiating the corona effect incorporating a metal rod terminated by a tip and connected to the group by an electric conductor, wherein it also comprises at least one electrode, whereof one end is in the vicinity of the rod tip, at least one piezoelectric crystal electrically connected to at least one electrode and a means for exerting a mechanical pressure on said piezoelectric crystal.

According to a secondary feature, the lightning conductor also comprises a means for transferring the electric charges produced around each electrode towards the tip of the rod. For example, said means can produce an upward air current between each electrode and the tip.

According to another secondary feature, the lightning conductor comprises a covering for protecting the piezoelectric crystals from the weather.

BRIEF DESCRIPTION OF THE DRAWINGS

The invention is described in greater detail hereinafter relative to non-limitative embodiments and with reference to the attached drawings, wherein is shown.

DETAILED DESCRIPTION OF THE PREFERRED EMBODIMENTS

Figure 1:
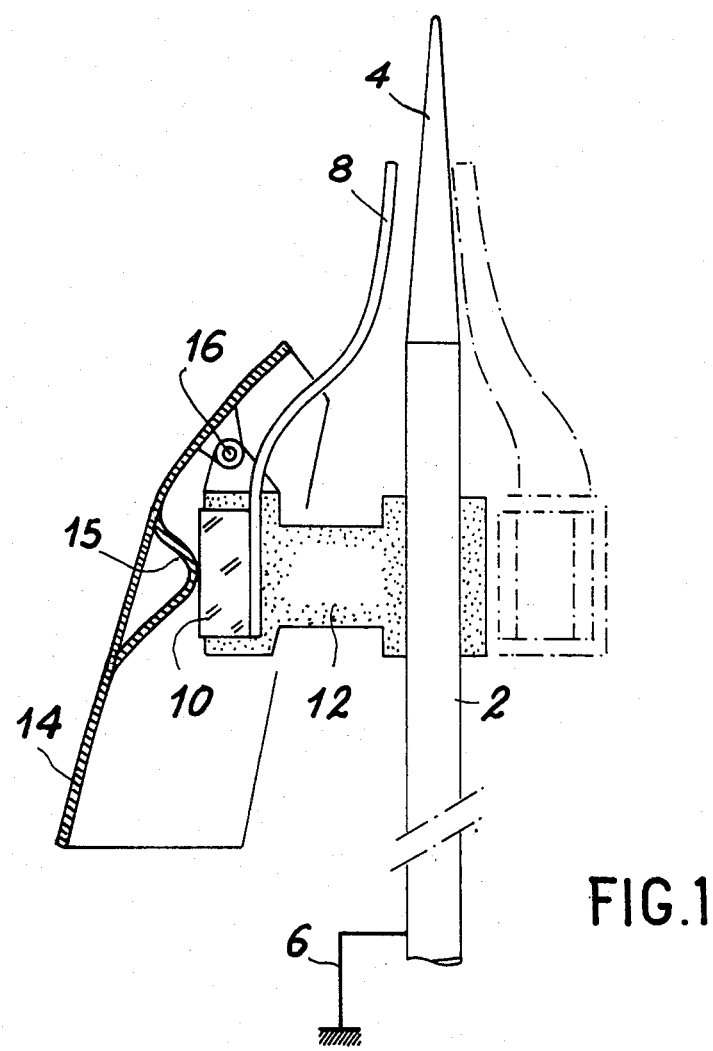
FIG. 1, a sectional view of a first embodiment of a lightning conductor according to the invention.

FIG. 1 diagrammatically shows a lightning conductor according to the invention, in which the piezoelectric crystals are excited by a wind force. This lightning conductor comprises a rod 2 connected by a connection 6 to earth and terminated at its upper end by a tip 4. One or more electrodes 8 are arranged in the vicinity of the tip 4 and are fixed to an insulating support 12 attached to rod 2. In order to raise the electrodes to a potential sufficient for initiating the corona effect, each electrode 8 is electrically connected to a piezoelectric crystal 10, which is also fixed to the insulating support 12 on which is exerted a compressive force. This force is created by a part 14 having a boss 15, which bears on piezoelectric crystal 10 under the action of the wind force. Part 14 is provided with a spindle 16, which is positioned in such a way that it acts as a lever and increases the wind force.

The shape of part 14 also aids the upward air currents and also ensures that the latter, together with a transverse wind force, can exert on part 14 a high pressure transmitted to piezoelectric crystal 10. Apart from the action on part 14, the upward air currents aid the transfer of free electrons, produced by the corona effect around electrode 8, towards the tip 4 of the lightning conductor. Finally, part 14 also serves to protect the piezoelectric crystal or crystals 10 from the weather.

It is advantageous to insulate part 14 from earth, e.g. by fixing spindle 16 of part 14 to insulating support 12, in such a way that electrode 8 is raised to the atmospheric potential of the considered moment, which increases its potential. In FIG. 1, a piezoelectric crystal 10 and a part 14 are associated with electrode 8, but it is obvious that other associations are possible. For example, a piezoelectric crystal 10 can be electrically connected to several electrodes 8. Moreover, there can be a random number of electrodes. However, bearing in mind the surface of part 14 necessary for producing the compressive force on piezoelectric crystal 10, the number of assemblies formed by the main part 8, 10, 14 is in practice reduced to a few units.

FIG. 1 shows an embodiment of a lightning conductor according to the invention, in which the wind energy is transmitted by means of a part forming a lever to the piezoelectric crystal. Other transmission means for said force are also possible. For example, FIGS. 2a and 2b illustrate a lightning conductor according to the invention, in which the wind energy is recovered by means of a turbine and is then converted into a compressive force applied to the piezoelectric crystals.

Figure 2A:
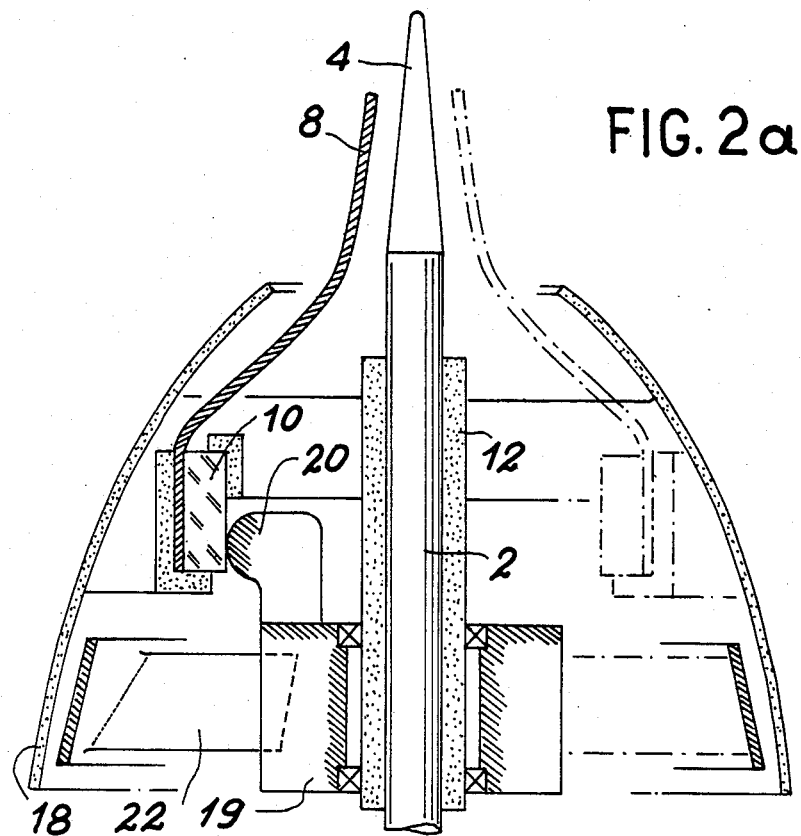
FIGS. 2a and 2b, respectively, a sectional view and a plan view of a second embodiment of a lightning conductor according to the invention.

The lightning conductor shown in sectional form in FIG. 2a comprises a rod 2 terminated by a tip 4, close to which are arranged one or more electrodes 8. As in the preceding figure, these electrodes 8 are electrically connected to one or more piezoelectric crystals 10. These electrodes 8 and these piezoelectric crystals 10 are fixed to the lightning conductor by means of an insulating support 12 attached to rod 2. This lightning conductor also comprises a turbine 22 mounted on a ring 19. The latter is surmounted by one or more bosses 20 which, by rotation, exert a pressure on the piezoelectric crystals 10, which thus transmit a high electric potential to electrodes 8. All the lightning conductor elements, and more particularly the piezoelectric crystals 10, are protected by a covering 18.

Figure 2B:
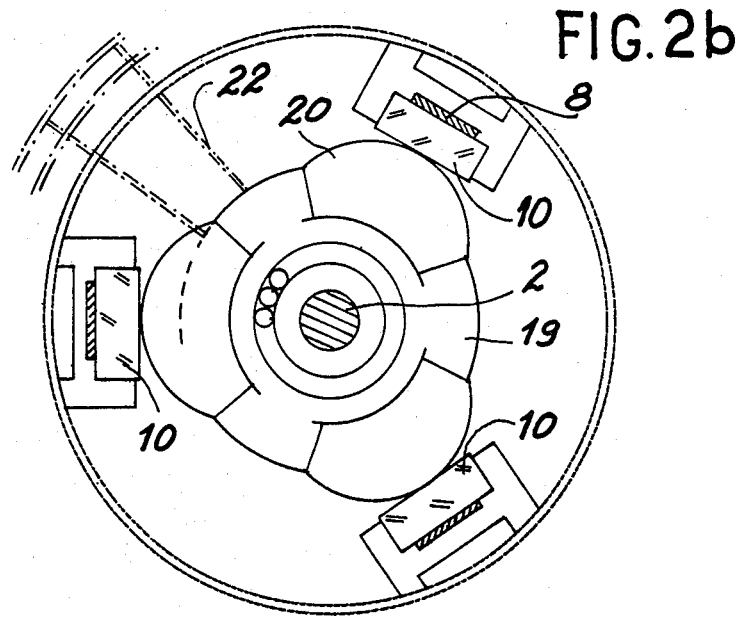

FIG. 2b more specifically shows the shape of ring 19 and bosses 20. FIG. 2b shows three piezoelectric crystals 10 and a ring 19 surmounted by three bosses 20. Obviously, this only constitutes one example. It would also be possible to arrange several bosses 20 on ring 19, in such a way that the different piezoelectric crystals 10 are sequentially excited and not simultaneously excited as illustrated by the drawing. It is also possible to envisage the use of a ring 19 surmounted by a single boss 20. The rotation speed of bosses 20, i.e. the excitation frequency of piezoelectric crystals 10, is dependent on the speed of the wind-driven turbine 22. Thus, it is possible to modify the rotation speed of bosses 20, by inserting a reduction gear between turbine 22 and bosses 20.

Preferably, turbine 22 is designed so that, during its rotation, it produces an upward air flow assisting the transfer towards rod 4 of the free electrons, produced by the corona effect around electrodes 8.

Figure 3A:
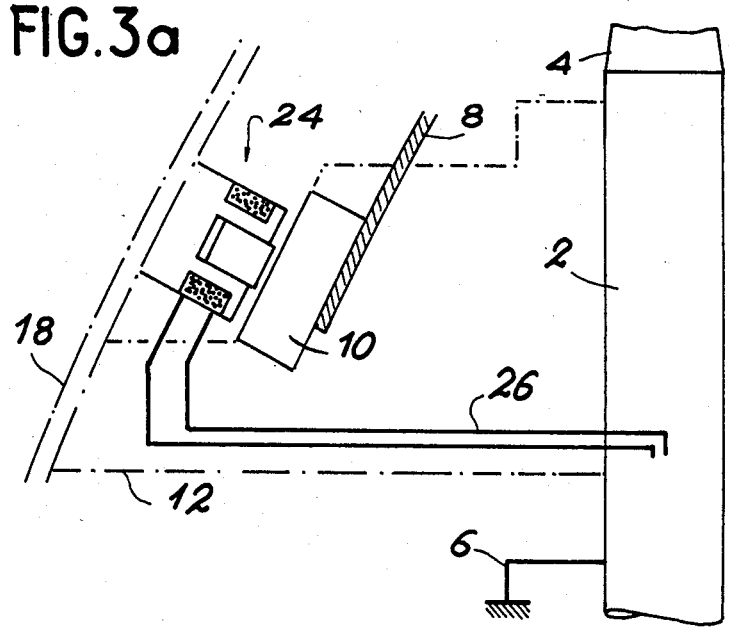
FIGS. 3a and 3b, sectional views of embodiments of a lightning conductor according to the invention, in which the piezoelectric crystal is excited by an electromagnet.
Figure 3B:
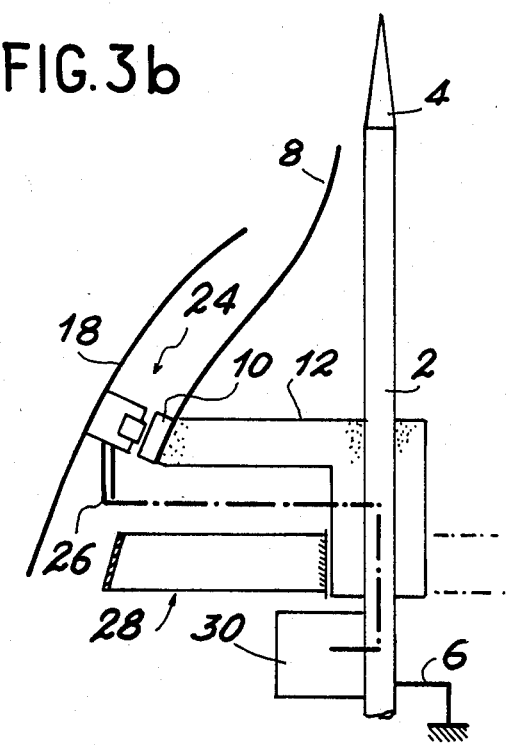

The embodiment of a lightning conductor according to the invention given in FIG. 3a differs from those given in the previous drawings by the fact that the pressure exerted on the piezoelectric crystals 10 is due to electric power and not to wind power. FIG. 3b shows an embodiment in which the action of the wind produces an electric current, which is the source of the compressive force.

FIG. 3a shows a lightning conductor rod 2 connected to earth by a connection 6 and terminated by a tip 4. This lightning conductor also comprises one or more electrodes 8 connected to one or more piezoelectric crystals 10, fixed to an insulating support 12 attached to rod 2. This lightning conductor also comprises a covering 18 for protecting the piezoelectric crystals 10 from the weather. It finally comprises at least one electromagnet 24 fixed to the inner face of covering 18 and facing each piezoelectric crystal 10. The electromagnet 24 is provided with supply leads 26, connected to a power supply.

The device functions in the following manner. When the leads 26 are supplied with an electric current, electromagnet 24 exerts a pressure on piezoelectric crystal 10, which raises the corresponding electrode 8 to an adequate potential for producing free electrons by the corona effect.

In the case where an electric power supply actuates the piezoelectric crystal, the electric circuit comprises means for protecting it from possible overvoltage due to lightning. Thus, in this case, it may also be advantageous to control the application of the current by an electric field sensor. In this way, the piezoelectric crystals are only actuated when there is a high probability of a lightning strike. This sensor may merely be a device indicating that the potential difference between the lightning conductor earth and the insulated electrode 8 exceeds a predetermined value.

FIG. 3b shows in sectional form a lightning conductor according to the invention, which only differs from that of the previous figures by the supply means for electromagnet 24. Thus, in this embodiment, the leads 26 are connected to a dynamo 30 controlled by a wind-powered turbine 28.

In preferred manner, in both FIGS. 3a and 3b, covering 18 has a shape aiding the appearance of an upward current between electrodes 8 and the lightning conductor tip 4.

Although in the three drawings provided the compressive force on the piezoelectric crystals is provided by electric power or wind power, it is obvious that other power types can be used for producing a compressive force on the piezoelectric crystals, e.g. magnetic energy, thermal energy or the like.

What is claimed is:

1. A lightning conductor with a device for initiating the corona effect incorporating a metal rod terminated by a tip and connected to the ground by an electric conductor, wherein it also comprises at least one electrode, whereof one end is in the vicinity of the rod tip, at least one piezoelectric crystal electrically connected to at least one electrode, and a means for exerting a mechanical pressure on said piezoelectric crystal.

2. A lightning conductor according to claim 1, wherein it also comprises a means for transferring the charged particles produced around each electrode to the tip of the rod.

3. A lightning conductor according to claim 2, wherein it also comprises a covering for protecting the piezoelectric crystals from the weather.

4. A lightning conductor according to claim 1, wherein it also comprises a covering for protecting the piezoelectric crystals from the weather.

* * * * *